（12） United States Patent
McCorriston et al.

(10) Patent No.: US 8,518,159 B2
(45) Date of Patent: Aug. 27, 2013

(54) TREATMENT OF WATER FOR USE IN HYDRAULIC FRACTURE STIMULATION

(75) Inventors: Lois Louise McCorriston, Calgary (CA); Jennifer N. Pond, Calgary (CA)

(73) Assignee: Encana Corporation, Calgary (CA)

( * ) Notice: Subject to any disclaimer, the term of this patent is extended or adjusted under 35 U.S.C. 154(b) by 99 days.

(21) Appl. No.: 13/267,538

(22) Filed: Oct. 6, 2011

(65) Prior Publication Data

US 2012/0085236 A1    Apr. 12, 2012

Related U.S. Application Data

(60) Provisional application No. 61/390,972, filed on Oct. 7, 2010.

(51) Int. Cl.
*B01D 19/00* (2006.01)
(52) U.S. Cl.
USPC ............................ 95/246; 96/193
(58) Field of Classification Search
USPC ............................ 95/246, 245; 96/193, 202
See application file for complete search history.

(56) References Cited

U.S. PATENT DOCUMENTS

| | | | | |
|---|---|---|---|---|
| 3,028,150 A | * | 4/1962 | King | 261/24 |
| 3,193,989 A | * | 7/1965 | Sebeste | 96/157 |
| 3,387,431 A | * | 6/1968 | Siebert | 95/136 |
| 3,518,166 A | | 6/1970 | Klett | |
| 3,754,376 A | * | 8/1973 | Kent | 95/258 |
| 4,111,759 A | | 9/1978 | Didycz et al. | |
| 4,292,293 A | | 9/1981 | Johnson et al. | |
| 4,609,384 A | * | 9/1986 | Ranke et al. | 95/246 |
| 4,680,127 A | | 7/1987 | Edmondson | |
| 4,696,718 A | * | 9/1987 | Lasater | 202/176 |
| 4,853,002 A | | 8/1989 | Niedzwiecki et al. | |
| 4,948,494 A | | 8/1990 | Stout | |
| 4,983,297 A | | 1/1991 | Kaczmarek et al. | |
| 5,008,022 A | | 4/1991 | Leder | |
| 5,286,389 A | | 2/1994 | Hardison | |

(Continued)

FOREIGN PATENT DOCUMENTS

| | | |
|---|---|---|
| EP | 0857509 | 8/1998 |
| GB | 2170220 | 7/1986 |

OTHER PUBLICATIONS

Chapter 4—Hydraulic Fracturing Fluids. Evaluation of Impacts to Underground Sources of Drinking Water by Hydraulic Fracturing of Coalbed Methane Reservoirs. Jun. 2004. US Environmental Protection Agency. EPA 816-R-04-003.
Frank, Wallace J. Removal of Hydrogen Sulfide and Carbon Dioxide from Injection Water by a Hydrocarbon Gas Cycling Process. Sep. 1968. Society of Petroleum Engineers.

(Continued)

*Primary Examiner* — Duane Smith
*Assistant Examiner* — Douglas Theisen
(74) *Attorney, Agent, or Firm* — Bennett Jones LLP

(57) ABSTRACT

A process and process line for treating water containing hydrogen sulfide for use as a hydraulic fracturing fluid is provided, to practice the following steps: separating a gaseous portion containing hydrogen sulfide from the water to form a first degassed water product; introducing the first degassed water product into a mechanical gas stripping unit and treating the first degassed water product with a stripper gas; recovering from the mechanical gas stripping unit at least one overhead vapor stream containing hydrogen sulfide and a stripped water stream as a bottom stream; degassing the stripped water stream in a degassing tank to produce a second degassed water product; and treating the second degassed water product with a hydrogen sulfide scavenger to produce a sweet water product having substantially reduced hydrogen sulfide.

12 Claims, 2 Drawing Sheets

(56) References Cited

U.S. PATENT DOCUMENTS

| | | | |
|---|---|---|---|
| 5,286,466 | A | 2/1994 | Hardison |
| 5,306,685 | A | 4/1994 | Khare |
| 5,688,478 | A | 11/1997 | Pounds et al. |
| 6,015,536 | A | 1/2000 | Lokkesmoe et al. |
| 6,074,562 | A | 6/2000 | Falkner |
| 6,221,277 | B1 | 4/2001 | Scranton, Jr. |
| 6,277,344 | B1 | 8/2001 | Hei et al. |
| 6,558,452 | B1 * | 5/2003 | Stonner et al. ............ 95/245 |
| 6,666,975 | B1 | 12/2003 | Chen et al. |
| 6,746,611 | B2 | 6/2004 | Davidson |
| 6,992,043 | B2 | 1/2006 | Scranton, Jr. |
| 7,625,432 | B2 | 12/2009 | Gouman et al. |
| 7,846,408 | B1 | 12/2010 | Cox, Jr. |
| 2005/0098504 | A1 | 5/2005 | Manz et al. |

OTHER PUBLICATIONS

Horaska, D.D. et al. Field Experiences Detailing Acrolein (2-propenal) Treatment of a Produced Water Injection System in the Sultanate of Oman. Mar. 2009. Society of Petroleum Engineers. SPE 120238.

Reed, C. et al. Acrolein Application to Mitigate Biogenic Sulfides and Remediate Injection Well Damage in a Gas Plant Water Disposal System. Feb. 2005. Society of Petroleum Engineers Inc. SPE 93602.

Howell, J.J. and Ward, M.B. The Use of Acrolein as a Hydrogen Sulfide Scavenger in Multiphase Production. Apr. 1991. Society of Petroleum Engineers, Inc. SPE 21712.

Foral, A.J. and Al-Ubaidi, B.H. Evaluation of H2S Scavenger Technologies. Aug. 1993. Gas Research Institute. GRI Report No. GR1-94/0197.

\* cited by examiner

TREATMENT OF WATER FOR USE IN HYDRAULIC FRACTURE STIMULATION

This application claims priority to U.S. Provisional Patent Application No. 61/390,972, the contents of which are incorporated herein by reference.

FIELD OF THE INVENTION

The present invention relates to processes and process lines for treating water containing hydrogen sulfide for use as a hydraulic fracturing fluid.

BACKGROUND OF THE INVENTION

The demand for water for hydraulic fracture stimulation (hydraulic fracturing or hydrofracing) of natural gas reservoirs is ever increasing. For example, unconventional gas such as shale gas requires multiple large slickwater fracturing stimulations applied to horizontal wells in order to enable the recovery of this resource. To meet these demands, it would be desirable to be able to use otherwise unusable water such as certain well water or discharge water from industrial processes without a significant environmental, economic, social, heritage or health effect.

It is important that water used for hydraulic fracture stimulation ("frac water") is compatible with the water present in the shale formation. Often, shale water is very high in calcium (upwards of 14,000 mg/L or more), magnesium, barium and strontium. Thus, it is important that frac water has a reduced amount of bicarbonate to prevent scaling. Scaling is primarily caused by the formation of calcium carbonate, magnesium carbonate, barium carbonate, and the like, which salts can deposit on surfaces such as the inside of pipes and build up until the passageway of the pipe is severely restricted.

However, some well water in certain areas contains significant amounts of hydrogen sulfide (e.g., some as high as 60 mg/L or parts per million [ppm] or higher), which may lead to health risks (death), corrosion problems, odor problems and the like. Further, in many cases the well water quality is saline, having total dissolved solids [TDS] concentrations ranging from about 4,000 mg/L to 25,000 mg/L TDS and in some cases 40,000 mg/L or higher. It is not uncommon for certain well water to have very high amounts of bicarbonate, in some instances, upwards to 3,300 mg/L or more. Thus, these water sources would be deemed unusable for domestic or agricultural purposes but could be a good water source for gas field development.

Many innovations in water treatment are required to enable saline sour water to be suitable for use in shale gas completions. Ideally, to ensure a safe work environment and protection of fracturing equipment, the acceptable operational hydrogen sulfide ($H_2S$) level should be close to zero ppm, for example, the maximum allowable $H_2S$ concentration preferably being less than 45 ppb in the liquid phase. Further, the amount of bicarbonate should be reduced to prevent scaling problems.

Thus, there is a need for an efficient process and process line for removing hydrogen sulfide and bicarbonate from water to render the water suitable for hydraulic fracture stimulation. More particularly, a process and process line is needed that may accomplish one or more of the following: removal of $H_2S$, preferably, irreversible removal of $H_2S$, prevention of scaling, no precipitates or liquid waste streams, closed loop system (i.e., not open to atmosphere) and minimum release of $H_2S$, in order to produce water that is suitable for use in hydraulic fracing.

SUMMARY OF THE INVENTION

A process and process line for the treatment of water containing hydrogen sulfide for use as a hydraulic fracturing fluid is provided.

In a first aspect, a process for treating water containing hydrogen sulfide for use as a hydraulic fracturing fluid is provided, comprising: separating a gaseous portion containing hydrogen sulfide from the water to form a first degassed water product; introducing the first degassed water product into a mechanical gas stripping unit and treating the first degassed water product with a stripper gas; recovering from the mechanical gas stripping unit at least one overhead vapor stream containing hydrogen sulfide and a stripped water stream as a bottom stream; degassing the stripped water stream in a degassing tank to produce a second degassed water product; and treating the second degassed water product with a hydrogen sulfide scavenger to produce a sweet water product having substantially reduced hydrogen sulfide.

In one embodiment, the water may also contain significant levels of bicarbonate. Thus, the gaseous portion containing hydrogen sulfide may also contain carbon dioxide. In another embodiment, the process further comprises adjusting the pH of the water from a higher first pH to a lower second pH prior to separating the gaseous portion containing hydrogen sulfide from the water to form the first degassed water product. Lowering the pH also helps remove bicarbonate in the form of $CO_2$. Thus, acids such as HCl can be added to the water to be treated. Further, if there is a high $CO_2$ content in the gas phase, the pH will increase in the separator if no acid, such as HCl, is added. In another embodiment, the pH of the water is adjusted to the lower second pH when the first pH is greater than about 7.

In a second aspect, a process line for treating water containing hydrogen sulfide for use as a hydraulic fracturing fluid is provided, comprising an inlet separator for receiving the water and removing a first amount of hydrogen sulfide from the water to produce a first degassed water product; a stripping unit comprising a feed inlet for receiving the first degassed water product and a stripper gas inlet for supplying stripper gas to the first degassed water product for removing a second amount of hydrogen sulfide and producing a stripped water product; a degassing tank for receiving the stripped water product and flashing off a third amount of hydrogen sulfide still remaining in the stripped water product to produce a second degassed water product; and at least one reaction tower for receiving the second degassed water product and a hydrogen sulfide scavenger for removing a portion of remaining hydrogen sulfide and producing sweet water having substantially reduced hydrogen sulfide.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DESCRIPTION OF VARIOUS EMBODIMENTS

The detailed description set forth below in connection with the appended drawing is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
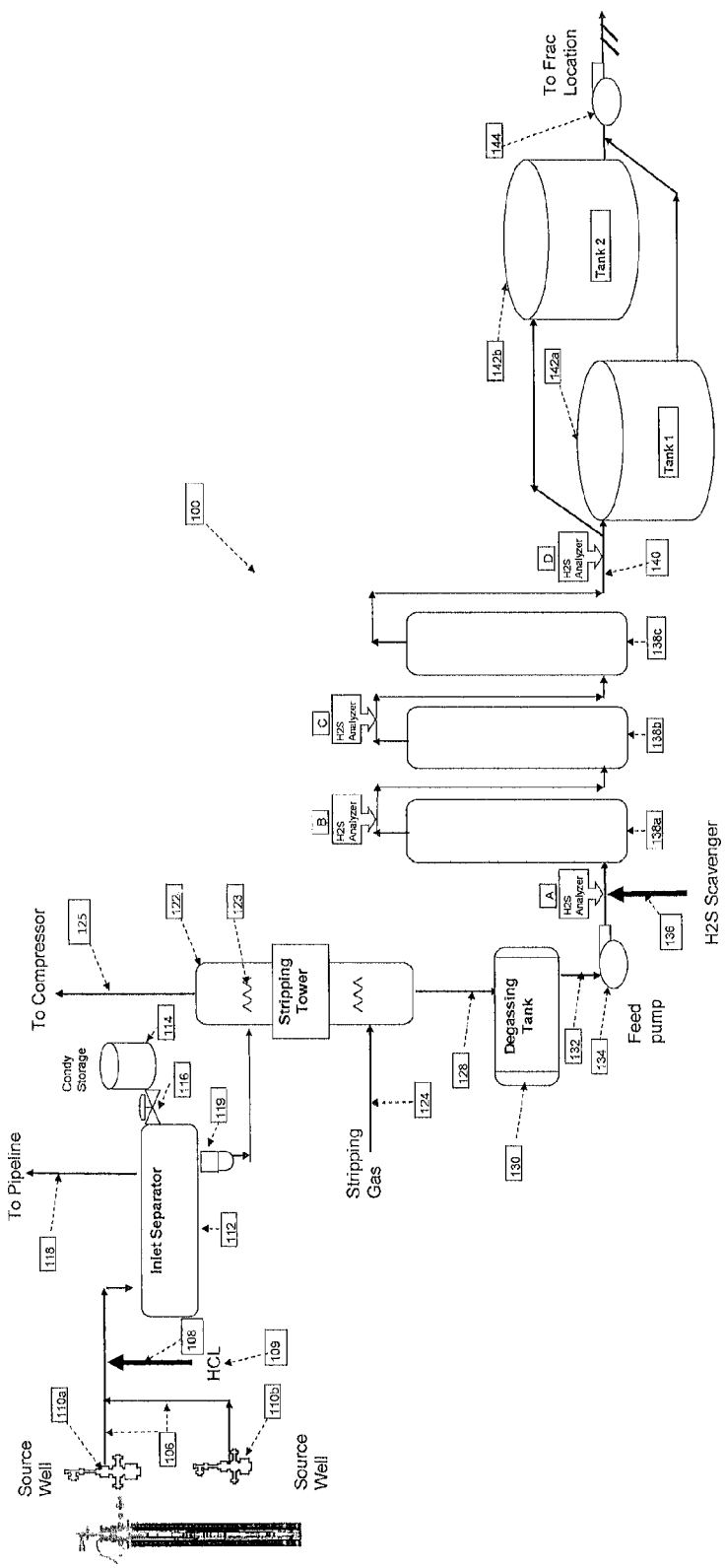
FIG. 1 is a process diagram of a process line for treating water containing hydrogen sulfide for use as a hydraulic fracturing fluid.

FIG. 1 is a schematic illustration of a process and process line 100 for treating well water. The source of water is this embodiment is sour saline water pumped from source wells 110a and 110b. It is understood that water can be supplied from only one source well or several source wells. It is understood, however, that other unconventional water can be used such as discharge water from industrial processes. To the sour saline water 106 is added a suitable amount of an acid such as hydrochloric acid (HCl), which may be contained in pH adjustment module 109, to lower the pH of the sour saline water from a higher first pH to a lower second pH. It is understood that other acids can also be used to lower the pH, for example, $CO_2$/carbonic acid, organic acids, such as formic acid, acetic acid, etc.

At neutral (~7) to alkaline pH, hydrogen sulfide in water tends to dissolve and convert into hydrosulfide ions ($HS^-$) and/or sulfide ions ($S^{--}$). However, in water having a more acidic pH (<7) the hydrosulfide ions tend to convert to hydrogen sulfide gas ($H_2S$). By using the addition of an acid to reduce the pH level of the well water, some of the hydrosulfide ions present in the well water will convert into the hydrogen sulfide gas ($H_2S$), which $H_2S$ gas will then separate from the water phase into the gaseous phase. In one embodiment, the pH of the water is reduced to a pH in the range of 5 to 7.

Further, the adjustment of the pH of the water prevents scaling if there is a high concentration of bicarbonate. Due to the high bicarbonate concentration with barium and calcium present, scaling is a major concern, especially when using high water volume. However, at more acidic pH, the bicarbonate is converted to carbon dioxide and the $CO_2$ can be removed together with the $H_2S$.

The sour saline water 106 having a second pH (preferably less than 7) is then fed to inlet separator 112 where flashing occurs. Inlet separator 112 generally comprises an inlet for receiving the water to be treated, a first outlet for removing gas (including $H_2S$) and a second outlet for removing the water for further treatment. In one embodiment, inlet separator may also have a third outlet controlled by valve 116, which is connected to condensate storage vessel 114 for collecting any condensate produced, which condensate may contain hydrocarbons.

Inlet separator 112 is a flash vessel that is operated at low pressure conditions to remove gases such as $H_2S$ and $CO_2$ from the water. The $H_2S$ and $CO_2$ gas 118, which may also contain other gases as well, which is removed, can be injected into a gathering pipeline (not shown). The water 120 is removed via outlet 119 and fed at or near the top of stripping tower 122. In one embodiment, stripping tower 122 comprises a plurality of sheds or trays 123 for maximum contact between the water and the stripping gas. It is understood that any conventional packed tower or tray tower can be used. Stripping gas 124, which is usually natural gas (methane), as this is readily available on site, is introduced via a high pressure gas line (not shown) at or near the bottom of stripping tower 122 and the counter-current flow of the gas stream allows the stripping gas 124 to mechanically strip $H_2S$ from the water and carry it through in the gas stream. $H_2S$-containing gas stream 125 is removed from stripping tower 122 and can be further compressed and injected into a gas gathering line at a compressor station (not shown). It is understood that other stripping gases may be used as is known in the art, for example, methane, steam, nitrogen, $CO_2$, or combinations thereof.

The stripped water 128 is removed from stripping tower 122 and at this stage the $H_2S$ concentration is significantly reduced, usually to less than half, for example, from 65 ppm present in the well water to less than about 30 ppm (e.g., about 14.7 to about 27 ppm), Stripped water 128 is further treated in degassing tank 130. Degassing tank 130 is a pressure tank which is used to drop the pressure of the stripped water 128 and flash off addition gas such as $CO_2$ and $H_2S$. The gas that flashes off the stripped water may be sent to an incinerator or flare, where propane can be supplied to the incinerator to ensure a combustion temperature of about 600° C. for complete combustion of the $H_2S$. In one embodiment, a static mixer (not shown) is used prior to treating the stripped water 128 in degassing tank 130.

The degassed water 132 is further treated to remove any remaining $H_2S$ through a series of reactor towers 138a, 138b, 138c. In particular, degassed water 132 is pumped via feed pump 134, which pump is used to increase the pressure to allow the degassed water 132 to flow through the reactor towers for chemical polishing. An $H_2S$ scavenger 136 is added to the degassed water prior to pumping the degassed water 132 to the first in the series of reactor towers, reactor tower 138a. The $H_2S$ scavenger is injected directly into the line with pumps and the rate of injection is dependent upon, and set according to, the measured $H_2S$ concentration in the liquid.

In one embodiment, the $H_2S$ scavenger used is acrolein (2-propenal). It was discovered that use of acrolein resulted in substantially complete removal of $H_2S$, i.e., substantially zero in both the water and gas phase, and the reaction product is a stable six member sulfur ring compound, 3-formyl-4-hydroxytetrahydrothiopyran, which produces no significant odor. Thus, the use of acrolein results in an essentially irreversible removal of $H_2S$, as the $H_2S$ cannot be regenerated. Further, no solids are produced, as the reaction product is water soluble. Further still, there is no increase in pH of the water and thus no increase in scaling.

It is understood, however, that other $H_2S$ scavengers, which include liquid, solid, and catalyst scavengers, as is known in the natural gas industry, can be used. Examples of $H_2S$ scavengers available on the market are SulfaTreat™ Scavenger, Sulfa-Check™ 2420, SulfuSorb™, Sulfa-Scrub™ (which contains triazine), Magnatreat™ M-401 and Iron Sponge™, to name a few. Caustic Soda, Zinc Oxide as well as other oxidants can also be used. Chlorine dioxide is an example of an oxidant and is described in UK Patent Application GB 2170220A.

The reaction of the $H_2S$ with the $H_2S$ scavenger occurs in the series of reaction towers 138a, 138b, and 138c. It is understood, however, that more or less reactor towers can be used. In one embodiment, the reactor towers are vertical plug flow from bottom to top allowing appropriate retention time at maximum plant throughput. It is desirable to use a $H_2S$ scavenger that generally does not produce any precipitates or solids in the system and where the reaction with the sulfides is an irreversible reaction (e.g., acrolein). Thus, when the scavenged water 140 is introduced to the atmospheric conditions, $H_2S$ cannot be released, as the sulfides are captured in another form.

If desired, a scale inhibitor may be added which is effective against calcium carbonate, calcium sulfate, barium sulfate, etc., scales. Scale inhibitors prevent undesirable build up on equipment used for hydraulic (racing, such as well tubular and field flow lines to help maximize production volume and reduce downtime. For example, Gyptron™ scale inhibitors, which are based on three types of compounds, phosphate esters, phosphonates and polymers, may be used. Other scale inhibitors known in the art can also be used. In one embodiment, the scale inhibitor is added prior to or after the sweet water is produced. In another embodiment, the scale inhibitor is added either upstream of the inlet separator 112 or at one or more points downstream of the inlet separator 112.

Two 1500 m³ tanks, tanks 142a, 142b, can be available for sweet water storage once processed. To avoid contamination, the supply pump 144 to the fracturing location may only pull from a tank that is full and isolated, thus, avoiding the possibility of contaminating a tank that is being drawn from.

Sulfide analyzers are placed at four different locations: A, prior to the injection point of the $H_2S$ scavenger to determine the injection rate of the scavenger; B, downstream of reaction tower 138a; C, downstream of reaction tower 138b; and, D, at the outlet of reaction tower 138c in order to monitor the quality of the scavenged water 140. Each of the critical analyzers has triple redundancy. Thus, if the water does not meet specification, the system will automatically recycle through the plant until specifications are met and the water is sweet.

EXAMPLE 1

Testing was performed on a water treatment plant as shown in FIG. 1 to evaluate the impact of hydrochloric acid addition on the performance of the process. Two separate water flow rates were tested: a flow rate by volume of 15,500 m³/d and 8,700 m³/d, respectively. The hydrochloric acid was added to the water prior to the inlet separator 112. As previously mentioned, adding HCl to the inlet stream reduces the pH of the water, thereby shifting the equilibrium of sulfide species in the aqueous phase from HS— to $H_2S$ which is expected to increase the amount of $H_2S$ evolved from the aqueous phase to the gas phase in the inlet separator 112 and stripping tower 122.

Figure 2:
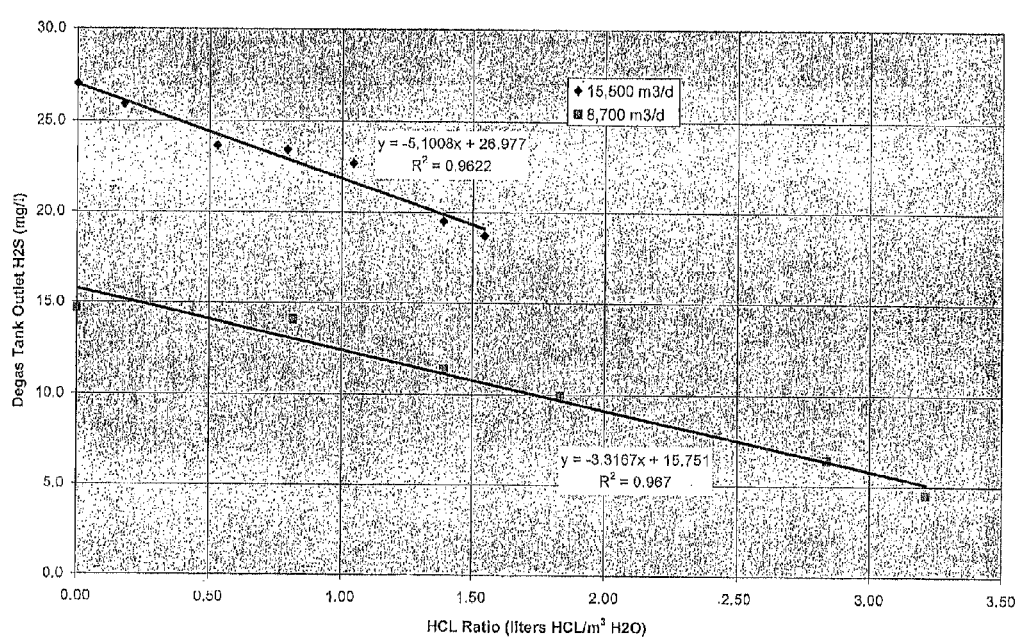
FIG. 2 is a graph showing the effect of addition of HCl on $H_2S$ concentrations in the water after the degassing tank as shown in FIG. 1.

FIG. 2 shows the $H_2S$ concentrations (mg/l) of the water exiting from the degassing tank 130 following separation in inlet separator 112 and stripping in stripping tower 122. It can be seen from FIG. 2 that at both flow rates there was a consistent reduction in aqueous $H_2S$ with increasing concentrations of HCl being added to the water prior to the inlet separator 112. Table 1 shows the concentration of $H_2S$ (ppm) at various points in the process subsequent to the degassing tank 130 for the two flow rates, 15,500 m³/d and 8,700 m³/d, respectively, in a typical running of the system, where the process is run without the addition of HCl and where the process is run with the addition of HCl, 1.55 L/m³ of 36.5% HCl and 3.21 L/m³, respectively, to reduce the pH of the water.

TABLE 1

| SAMPLE | WITHOUT HCL CONCENTRA-TION OF $H_2S$ (PPM) | WITH HCL CONCENTRA-TION OF $H_2S$ (PPM) |
|---|---|---|
| Source Well Water Point A (Prior to addition of acrolein) | 65 | 65 |
| Water Rate 15,500 m³/d | 27.0 | 18.7 (a) |
| Water Rate 8,700 m³/d | 14.7 | 4.5 (b) |
| Point B (After Tower 1) | <2 | <2 |
| Point C (After Tower 2) | <0.5 | 0.5 |
| Point D (After Tower 3) | <45 ppb | <45 ppb |

(a) 1.55 L/m³ (36.5% HCl)
(b) 3.21 L/m³ (36.5% HCl)

It can be seen from Table 1 that when HCl is added to the water to be treated, the concentration of $H_2S$ in the water at Point A, i.e., immediately prior to the addition of the $H_2S$ scavenger (acrolein), is significantly reduced relative to when no HCl is added. In fact, with flow rate (b), the amount of $H_2S$ is typically reduced to about 4.5 ppm. This results in considerably less $H_2S$ scavenger that needs to be added to the process. Thus, for optimization of the process, addition of HCl is desirable. However, the concentration of $H_2S$ in the end product (water after Tower 3) is substantially the same with or without the addition of HCl.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A process for treating water containing hydrogen sulfide for use as a hydraulic fracturing fluid, comprising:
    separating a gaseous portion containing hydrogen sulfide from the water to form a first degassed water product;
    introducing the first degassed water product into a mechanical gas stripping unit and treating the first degassed water product with a stripper gas;
    recovering from the mechanical gas stripping unit at least one overhead vapor stream containing hydrogen sulfide and a stripped water stream as a bottom stream;
    degassing the stripped water stream in a degassing tank to produce a second degassed water product; and
    treating the second degassed water product with a hydrogen sulfide scavenger to produce a sweet water product having substantially reduced hydrogen sulfide.

2. The process of claim 1, wherein the water to be treated further comprises bicarbonate and the gaseous portion containing hydrogen sulfide further contains carbon dioxide.

3. The process of claim 1 further comprising adjusting the pH of the water from a higher first pH to a lower second pH prior to separating the gaseous portion containing hydrogen sulfide from the water to form a first degassed water product.

4. The process of claim 3 wherein the second pH is less than about 7.

5. The process of claim 3 wherein the pH of the water is lowered from the first pH to the second pH by the addition of an acid.

6. The process of claim 5 wherein the acid is hydrochloric acid.

7. The process of claim 1 wherein the hydrogen sulfide scavenger is acrolein.

8. The process of claim 1 wherein the hydrogen sulfide concentration of the sweet water is equal to or less than about 45 ppb.

9. The process of claim 1 further comprising adding a scale inhibitor prior to or after the sweet water product is produced.

10. A process line for treating water containing hydrogen sulfide for use as a hydraulic fracturing fluid, comprising:
  an inlet separator for receiving the water and removing a first amount of hydrogen sulfide from the water to produce a first degassed water product;
  a stripping unit comprising a feed inlet for receiving the first degassed water product and a stripper gas inlet for supplying stripper gas to the degassed water product for removing a second amount of hydrogen sulfide and producing a stripped water product;
  a degassing tank for receiving the stripped water product and flashing off a third amount of hydrogen sulfide still remaining in the stripped water product to produce a second degassed water product; and
  at least one reaction tower for receiving the second degassed water product and a hydrogen sulfide scavenger for removing a portion of remaining hydrogen sulfide and producing sweet water having substantially reduced hydrogen sulfide.

11. The process line of claim 10 further comprising a pH adjustment module for adjusting the pH of the water prior to it being received by the inlet separator.

12. The process line of claim 10 wherein three reaction towers are provided in series.

* * * * *